(12) United States Patent
Le et al.

(10) Patent No.: US 6,882,625 B2
(45) Date of Patent: Apr. 19, 2005

(54) METHOD FOR SCHEDULING PACKETIZED DATA TRAFFIC

(75) Inventors: Khiem Le, Coppell, TX (US); Ghassan Naim, Irving, TX (US)

(73) Assignee: Nokia Networks Oy, Espoo (FI)

( * ) Notice: Subject to any disclaimer, the term of this patent is extended or adjusted under 35 U.S.C. 154(b) by 879 days.

(21) Appl. No.: 09/735,999

(22) Filed: Dec. 14, 2000

(65) Prior Publication Data

US 2002/0075804 A1 Jun. 20, 2002

(51) Int. Cl.⁷ .............................................. H04L 12/26
(52) U.S. Cl. ............ 370/238; 370/395.41; 370/395.42; 370/412; 370/468
(58) Field of Search ................................. 370/229, 230, 370/232, 234, 235, 238, 253, 265, 389, 394, 395.4, 395.41, 395.42, 395.43, 412, 428, 429, 462, 468, 470–474, 476

(56) References Cited

U.S. PATENT DOCUMENTS

| | | | | |
|---|---|---|---|---|
| 6,058,114 A | * | 5/2000 | Sethuram et al. | 370/397 |
| 6,243,667 B1 | * | 6/2001 | Kerr et al. | 703/27 |
| 6,477,180 B1 | * | 11/2002 | Aggarwal et al. | 370/468 |
| 6,724,721 B1 | * | 4/2004 | Cheriton | 370/229 |
| 6,728,365 B1 | * | 4/2004 | Li et al. | 379/329 |

* cited by examiner

Primary Examiner—Wellington Chin
Assistant Examiner—John Shew
(74) Attorney, Agent, or Firm—Antonelli, Terry, Stout & Kraus, LLP

(57) ABSTRACT

A method for scheduling data packets from a plurality of flows into a single flow. Data packets are broken into data segments and assigned a slack value based on how long the segment can wait until transmission begins. Every time a transmission opportunity passes, the slack value of the segment is decreased. The scheduler prioritizes the segments based on their slack value.

24 Claims, 3 Drawing Sheets

METHOD FOR SCHEDULING PACKETIZED DATA TRAFFIC

BACKGROUND OF THE INVENTION

1. Field of the Invention

This invention relates to a method for scheduling data streams and, more particularly, to a method for scheduling a packet based data stream using a slack value calculation.

2. Description of the Prior Art

In many networking arrangements, it is necessary for a plurality of data streams to be combined to share a limited number of channels or even a single line. This can happen, for example, in a wireless type network where a number of units are routed to a base station which is further connected through a single channel. Thus, the various streams going to the individual units must be handled through a single channel. Another similar situation is where various kinds of data streams, such as voice data, real time video data, email and other data are all handled through an Internet protocol network. These various different kinds of data must be combined into a limited number of channels or even a single channel for transmission.

Whenever such data streams are merged, it is necessary to have some protocol for selecting the order in which they are placed in the channel. While the simplest solution may be a first come, first serve arrangement, this may not be the most effective since some data streams are more time sensitive than others. For example, voice signals cannot be delayed very much at all, whereas email messages may be delayed by a substantial amount. Accordingly, a number of protocols have been sought to provide fair and optimum criteria for multiple users so that delay is reduced, invalid data is minimized and data throughout is maximized.

One attempt at such a scheduling method is referred to as deficit round robin where a fairness level is achieved by using a deficit counter and a quantum of service for each user flow which decides how long the flow should constantly be served before moving onto the next data flow. The maximum delay for revisiting a user is governed by the round duration in the scheduler and depends on the packet lengths and the number of flows in the system. However, this method is inefficient when lower bound delay requirements must be satisfied. This is because the packet may be delayed by a full round duration and since the maximum delay is governed by the round duration, it would be impossible to provide different delay bounds to different flows, thereby resulting in a high drop ratio of packets, that is, real time packets that exceed their delay requirements.

In a method called the weighted fair queuing, the delay in a user packet flow is decreased by increasing the allocated service rate and in another method referred to as earliest due date, each flow is served using a deadline base strategy where the user with the packet of earliest deadline waiting to be scheduled is selected first. In these two systems, the transmission of a scheduled packet must be completed before scheduling another packet. Therefore, the delay guarantees of a packet depends on the length of another packet in a different flow sharing the same channel. Thus, a new short packet arriving in the system could time out while waiting for another packet of lower sensitivity to finish transmission. This leads to lower system throughput. Another drawback of weighted fair queuing scheduling is that the number of bits served in a scheduling round is proportional to the rate allocated to the flow. To reduce the delay for a flow, its allocated rate must be set-up to a higher volume before starting service of the flow. Given that the rate is fixed throughout service of the flow, the coupling between the rate allocation and the delay may lead to inefficient resource utilization. While a low value does not provide enough quality of service, a very large rate allocation leads to a waste of bandwidth. This is due to the rate fluctuations in a real time variable bit rate traffic.

SUMMARY OF THE INVENTION

Accordingly, the present invention provides a method for scheduling data flows from concurrent data streams.

The present invention also provides a method for scheduling data streams by splitting packets into data segments.

This invention further provides a method for scheduling data segments from different data streams using a slack measure for a scheduling decision.

The present invention still further provides the use of a slack measurement for data segment scheduling decisions where the slack value is based on its deadline and estimated transmission time.

The present invention further provides an apparatus for segmenting incoming data traffic packets into data segments, for assigning slack time to each data segment and for scheduling the transmission of the packets based on the determined slack time.

Briefly, the invention is achieved by providing a method for splitting a data packet into data segments which can be scheduled independently for transmission and using a slack measure as an input to the scheduling decision. The slack measurement provides a measure of how much cumulative time a packet can tolerate to wait and still meet its requirements.

BRIEF DESCRIPTION OF THE DRAWINGS

A more complete appreciation of the invention and many of the attendant advantages thereof will be readily obtained as the same becomes better understood by reference to the following detailed description when considered in connection with the accompanying drawings, wherein.

DESCRIPTION OF THE PREFERRED EMBODIMENTS

Figure 1:
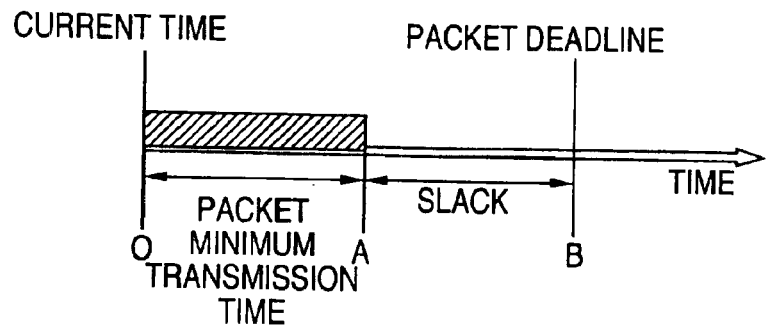
FIG. 1 is a graph showing the measurement of the slack time.

The present method is based on two steps. First, a data packet is split into data segments which can independently be scheduled for transmission. Secondly, a slack measure is calculated for each packet based on its quality of service requirements that could be assigned to the data segments to provide a measure of how much cumulative waiting time the packet can tolerate and still meet its necessary requirements. By splitting the packet into shorter data segments, it is possible to move parts of the packet independently which gives the scheduler more freedom to intersperse parts of the packet and to thus keep the flow more even. Thus, unlike other proposed methods, the present slack measure method supports the variation in delay bounds between different flows. This is due to the ability to monitor the requirements of each packet independently and, therefore, provide a dynamic priority allocation at the packet basis. Thus, it provides scheduling at the data segment level. This provides the scheduler with the capability of switching service between multiple packets. Thus, packets which are sensitive to delay do not have to wait until another packet transmission is complete if that packet can afford extra delay. This leads to an increase in the system throughput.

The present method also allows for possibilities to look ahead and determine if a packet will exceed its requirements and, therefore, drop the packet completely before continuing or starting its service. This is useful in congestion control and for efficient utilization of the bandwidth. This is achieved by eliminating the allocation of bandwidths for packets that are not successfully extracted at the user end and using the bandwidth for other packets that are known to be successfully generated at the user end. This improves the quality of service as seen by the user and increases bandwidth utilization efficiency.

The various data packets are split into data segments for scheduling and transmission. In packet cellular systems, the data segments correspond to the radio link control or multiple access control blocks. A data segment is transmitted individually over the transmission channel when a transmission opportunity is granted. Thus, in time division multiple access systems, a transmission opportunity is a time slot. In a wideband code division multiple access system, it is the utilization of the unique Walsh code in a radio frame. In this system, the radio frame is shared by multiple users using different Walsh codes.

Once the packet is split into data segments, it is necessary for the scheduler to schedule the data segments. The segments are organized into a schedule in order to use the transmission opportunities which are available. Thus, for example, in a wireless link, where concurrent users are involved, the scheduler would schedule concurrent user traffic flows waiting for service on both the uplink and the downlink. However, the scheduling must be accomplished so that all user flows are served in a fair and optimum fashion that will meet the traffic constraints and maximize the system throughput.

In order to determine the order in which the data segments from different flows should be arranged, the present method assigns a slack value for each packet. This value is then similarly assigned to each segment from that packet. The slack value is calculated based on the deadline by which the packet must complete its transmission and also the estimated minimum transmission time. This is graphically shown in FIG. 1 where time is the variable in the horizontal direction starting at point O. The time necessary to transmit a packet, assuming no delays, is shown in the cross-hatched area extending from O to A. If the time deadline for transmitting the packet is given at point B, the slack time is the time between the transmission time and the deadline or as indicated in the Figure, AB. The slack value is a number which corresponds to this amount of time. Thus, the slack value is directly related to the amount of time that the segments from the packet can wait before transmission is started. This value can be measured in terms of the number of transmission opportunities that can be missed during the transmission of all the data segments of the packet.

After the packet is segmented into data segments and the slack value is assigned to each of the segments, the segments wait for their turn. One manner of using the slack value is to give lower slack value segments priority over higher values. Other methods may also be used by incorporating other criteria along with the slack value to determine priority. Every time the packet is not included in a transmission opportunity, its slack value is decreased. In terms of FIG. 1, the deadline B becomes closer to the current time O but the transmission time of the remaining data segments of the packet does not change so that the slack time AB becomes smaller. This indicates that the amount of time it can wait before transmission decreases. When a part of the packet is included in a transmission, the slack value does not change. This is because the amount of transmission time needed will be shortened by the same amount of time that the deadline is shortened. Thus, in FIG. 1, while B will get closer to O, A will also be closer to O by the same amount so that the slack time AB remains the same. When a segment has a slack value of zero, this indicates that it must be serviced at every upcoming transmission opportunity in order to meet its deadline requirement. Since the data segments of a packet all have the same value, these data segments all have a slack value of zero at the same time and thus they will all be transmitted at every transmission opportunity.

Given the real time nature and variable bit rate characteristics of the traffic (such as real time video and streaming video) the present slack method dynamically organizes the transmission order of the packets in the system in order to meet quality of service requirements involving delay and jitter.

This scheduling method is integrated with other systems and methods in the transmission device which also operate to control the transmission of the data. However, these other systems are not discussed herein since they do not effect the particular operation of the scheduling method.

Figure 2:
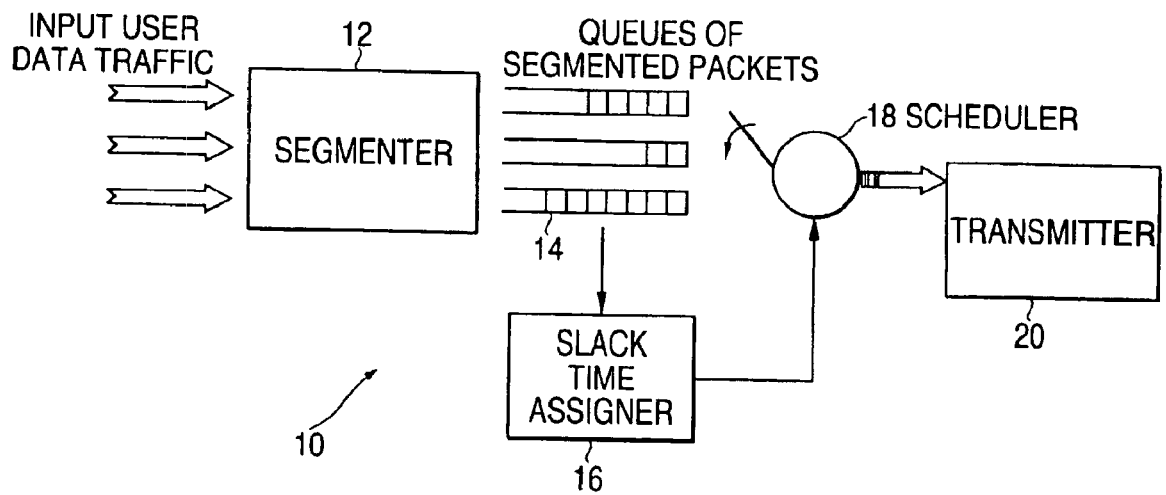
FIG. 2 is a block diagram showing an apparatus for scheduling data traffic according to the present invention.

FIG. 2 shows an apparatus 10 for accomplishing this process. A plurality of data streams, labeled input user data traffic and indicated by the arrows on the left hand side of the figure, are input into the system. They first enter a segmenter 12 which divides the packets into a series of data segments. The segments are stored in queues 14. The packets are also assigned a slack time value as discussed above, by the slack time assigner 16. This information is stored, then used by the scheduler 18 which selects the data segments which are to be transmitted next. The scheduler outputs the selected data segments and sends them to transmitter 20 for transmission. It is possible for a single user to have more than one active data stream. Thus, more than one queue could hold data for the same user.

Figure 3:
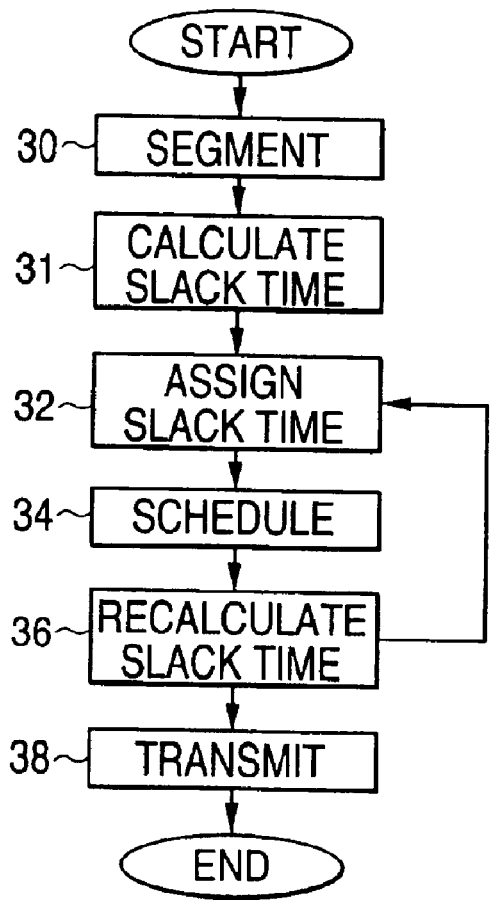
FIG. 3 is a flow chart showing the steps of the method for scheduling transmission according to the present invention.

FIG. 3 is a flowchart showing the basic steps of the method described above. That is, in step 30, the incoming data traffic is segmented in order to form data segments. The slack time value is calculated in step 31 and then assigned to the packets in step 32. This value corresponds to the measurement of the slack time as discussed above in regard to FIG. 1. Based on the slack time, the schedule of data segments is determined in step 34. For segments which are not going to be transmitted immediately, the slack time value is recalculated in step 36 and the new slack time is inserted in step 32. Once the particular data segment is selected, it is then transmitted in step 38.

Figure 4:
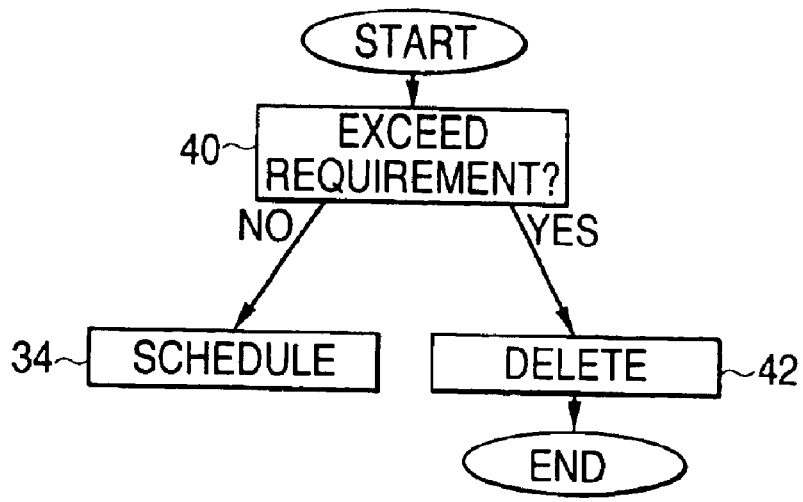
FIG. 4 is a flow chart indicating the steps involved in a variation of the method of FIG. 3.

FIG. 4 shows a procedure which can be included in step 34 to determine if a packet does not have any chance of being sent in time. In such a situation, it is better to not bother to waste time sending part of it since it will be useless at the other end anyway and since the time can better be spent on generating other segments. Accordingly, when a segment is being considered for the schedule in step 34 in FIG. 3, instead the arrangement in FIG. 4 can be used. That is, first the packet is examined to determine if it will exceed the amount of time that it has available and thus not be suitable for sending. If it does not exceed these requirements, it then is scheduled for transmission in the normal course of the method as described above. However, if it does exceed these requirements then the entire packet is deleted as indicated in step 42.

Figure 5:
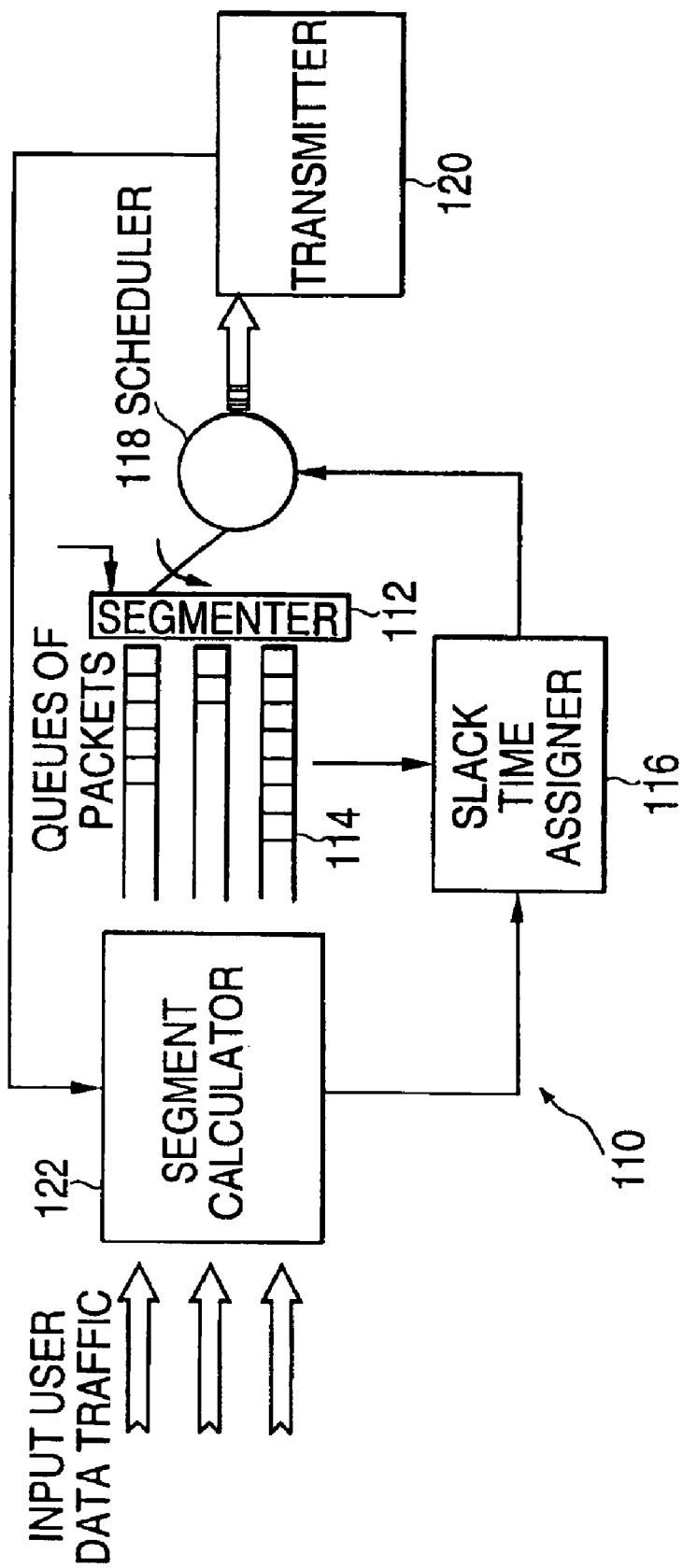
FIG. 5 is a block diagram showing a second apparatus for scheduling data traffic according to the present invention.

FIG. 5 shows an alternative arrangement 110 to the apparatus of FIG. 2. Input user data traffic is still indicated by arrows on the left hand side of the figure. The data traffic first enters a segment calculator which calculates the slack time for the entire packet. The entire packet is then placed in queues 114. Segmenter 112 operates on the packets as they reach the front of the queue and after the scheduler 118 selects it for transmission. The segmenter 112 will generate only one data segment from the packet based on the data segment length available from the transmitter for the current transmission opportunity. Thus, the data segment limit length can vary at any time. The transmitter is aware of this change and will send information regarding the new data segment length value to the segmenter and the segment calculator. Thus, in this arrangement the slack value is assigned to the entire packet and not a single segment. Thus, all segments of the same packet have the same slack value. Any recalculating of the slack value for one segment requires the same value for all of their data segments in the same packet.

The slack process described above can be implemented at any node in the network where scheduling is required so that different delay guarantees or packets of different traffic flows can be accomplished. It can also be used in scheduling non-real time traffic with some delay requirements to provide a fair allocation of fair transmission media. Although a discussion has assumed the service of Internet protocol packets, it can also be applied with any packet data service which must meet some delay and/or jitter constraints.

Numerous additional modifications and variations of the present invention are possible in light of the above teachings. It is, therefore, to be understood that within the scope of the appended claims and the invention may be practiced otherwise than as specifically described herein.

What is claimed is:

1. A method for scheduling data packets comprising:
   segmenting each data packet into data segments;
   assigning a slack value to each data segment of a packet, wherein the slack value is a function of a deadline for transmitting each data segment of the packet and an estimated transmission time necessary for transmission of the packet; and
   scheduling data segments for transmission based on slack values of data segments.

2. The method according to claim 1, further comprising:
   decreasing the slack value of a segment if a transmission opportunity is missed.

3. The method according to claim 1, wherein the slack value is measured in terms of the amount of transmission opportunities that can be missed.

4. The method according to claim 1, further comprising:
   looking ahead to locate packets which will exceed requirements and deleting such packets.

5. A transmission apparatus comprising:
   a plurality of data streams;
   a transmitter connected to said plurality of data streams;
   a scheduler for determining which data stream will be serviced by said transmitter; and wherein
   said scheduler selects a data stream for service based on a slack value of data segments in each stream, wherein the slack value is a function of a deadline for transmitting each data segment and an estimated transmission time necessary for the transmission of said data segments of the selected data stream.

6. The apparatus according to claim 5, wherein said scheduler segments data packets in said data streams into data segments.

7. The apparatus according to claim 5, wherein said scheduler decreases slack values when a transmission opportunity is missed.

8. The apparatus according to claim 5, comprising a slack value assigner for assigning said slack values to said data segments.

9. The method of transmitting data comprising:
   connecting a transmitter to a plurality of data streams for transmission;
   assigning slack values to data in said data streams, said slack values being a function of a deadline for transmitting said data and an estimated transmission time necessary for transmission of said data of said data streams; and
   scheduling the data streams for transmission by said transmitter, said scheduling being determined by said slack values.

10. The method according to claim 9, wherein data packets in said data streams are segmented into data segments.

11. The method according to claim 10, wherein slack values are assigned to each data segment.

12. The method according to claim 11, wherein each slack value is decreased for every transmission opportunity missed.

13. The method according to claim 1 wherein:
    the estimated transmission time is a minimum transmission time necessary for transmission of each data segment of the packet.

14. The method according to claim 2 wherein:
    the estimated transmission time is a minimum transmission time necessary for transmission of each data segment of the packet.

15. The method according to claim 3 wherein:
    the estimated transmission time is a minimum transmission time necessary for transmission of each data segment of the packet.

16. The method according to claim 4 wherein:
    the estimated transmission time is a minimum transmission time necessary for transmission of each data segment of the packet.

17. The apparatus according to claim 5 wherein:
    the estimated transmission time is a minimum transmission time necessary for transmission of the data segments of the selected data stream.

18. The apparatus according to claim 6 wherein:
    the estimated transmission time is a minimum transmission time necessary for transmission of the data segments of the selected data stream.

19. The apparatus according to claim 7 wherein:
    the estimated transmission time is a minimum transmission time necessary for transmission of the data segments of the selected data stream.

20. The apparatus according to claim 8 wherein:
    the estimated transmission time is a minimum transmission time necessary for transmission of the data segments of the selected data streams.

21. The method according to claim 9 wherein:
    the estimated transmission time is a minimum transmission time necessary for transmission of said data of said data streams.

22. The method according to claim 10 wherein:
    the estimated transmission time is a minimum transmission time necessary for transmission of said data of said data streams.

23. The method according to claim 11 wherein:
    the estimated transmission time is a minimum transmission time necessary for transmission of said data of said data streams.

24. The method according to claim 12 wherein:
    the estimated transmission time is a minimum transmission time necessary for transmission of said data of said data streams.

* * * * *